Oct. 17, 1950     E. L. MASTERS     2,526,609
AGITATOR FOR FERTILIZER SPREADERS
Filed Nov. 15, 1946
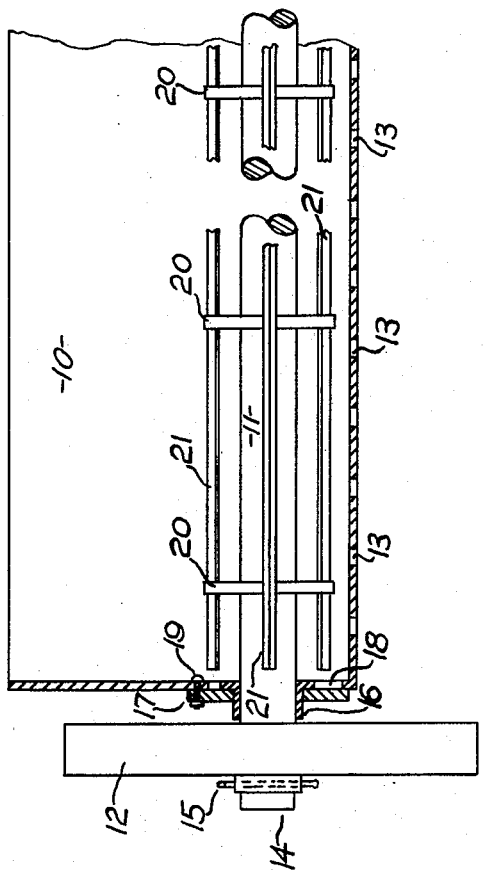
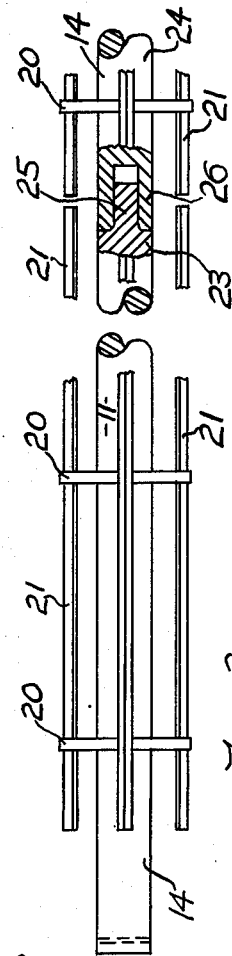
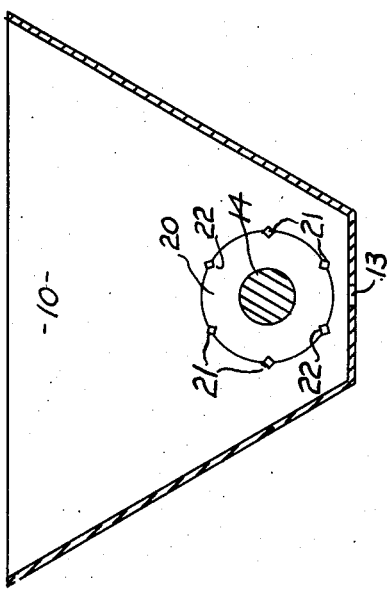
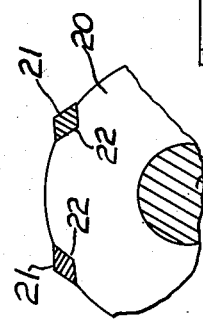
INVENTOR.
EDWIN L. MASTERS
BY
Charles K Woodie
AGENT Patented Oct. 17, 1950

2,526,609

UNITED STATES PATENT OFFICE 2,526,609

AGITATOR FOR FERTILIZER SPREADERS

Edwin L. Masters, Benton Harbor, Mich.

Application November 15, 1946, Serial No. 710,100

2 Claims. (Cl. 222—177)

This invention relates to an improved form of agitator for fertilizer spreaders. It is described as applied to small fertilizer spreaders of the type used in the household garden but the same principles of structure may be applied to fertilizer spreaders of any size.

It is well understood and appreciated in the art of spreading fertilizer, that commercial fertilizers as used in spreaders of this type are very difficult to handle. They are normally in finely powdered form but because of their caustic chemical nature, they become easily packed and lumpy under the best conditions, even when the greatest care is exercised to prevent the absorption of moisture. Under normal operating conditions, the fertilizer is often left in the fields overnight, and, as a result, instead of being in the finely powdered form to permit fine even distribution, the fertilizer is often lumpy which mitigates seriously against its fine even distribution so necessary for economic and other reasons for this high priced material.

Although the conventional purpose of the agitator is to feed the finely powdered fertilizer through apertures in the spreader bin, and although these agitators are well adapted for this purpose, under conditions where the fertilizer is lumpy, the conventional form of agitator often fails in its purpose because of its inability to contend with the lumpy condition of the fertilizer. The principal object of the present invention is to provide in a fertilizer agitator, effective structure to cut and pulverize lumpy fertilizer in order that it may be evenly and finely distributed through the apertures in the bin.

One major object is to provide a fertilizer spreader which overcomes the deficiencies of the prior art.

Another object of the invention is to provide in an agitator structure, agitator feeder bars that may be adjusted closer to the openings in the feeder bar in order to prevent obstructions from lumps and to assure the even feeding of finely divided fertilizer.

Still another object is to provide a fertilizer distributor wherein dual aligned agitators may be used, there being means provided for permitting differential action between the agitators.

Other objects and benefits will be shown to appear in connection with the following descriptions and drawings in which:

Fig. 1 is a transverse sectional view through a fertilizer spreader showing the agitator structure therein;

Fig. 2 is a cross sectional view of the fertilizer bin and agitator;

Fig. 3 is a fragmentary elevational view of the agitator with parts broken away to show an optional structure; and Fig. 4 is a fragmentary cross sectional view of an agitator.

As shown in Fig. 1 of the drawings, the principal parts of a fertilizer spreader to which this invention relates are a fertilizer bin 10 for containing the material to be spread, an agitator structure 11 for maintaining the material in a granular condition, and wheels 12 for supporting and moving the bin. The side walls of the bin 10 are sloped, as seen in Fig. 2, to gravitate the fertilizer toward the spaced apertures 13 in the bottom of the bin. A handle is provided for moving the spreader but is not shown in the drawings.

From a study of the drawings, it will become apparent that the agitator is mounted upon a shaft 14 which is also the axle of the spreader. The wheel 12 is fixedly mounted to the shaft 14 by a key 15 so that upon movement of the spreader and rotation of the wheels, the agitator will rotate to perform its function. The other wheel of the spreader is rotatably mounted on the shaft to permit easy turning movements of the spreader. A bearing 16 for the shaft 14 is provided in the end wall of the bin, and is mounted upon an end plate 17. The end plate 17 is adapted to cover an aperture 18 in the end wall of the bin and is bolted thereto, as by bolt 19, it being the object of this structure to enable the agitator 11 to be removed from the bin so that the agitator and bin can be effectively cleaned and thus maintained in effective operation.

The agitator structure in its preferred form consists of discs 20 mounted upon the shaft 14 in spaced relationship and the agitator bars 21. As best seen in Fig. 2 of the drawing, the discs 20 are of washer-like construction having apertures in their center to permit them to be fitted over the shaft 14 to which they are rigidly held in appropriate position by welding. V-shaped notches 22 are provided in the peripheral edge of the discs 20 into which the bars 21, which function as the blades of the agitator, are fixed by welding. Various numbers of such rods may be used in the agitator structure, but I find that for most purposes, six is an optimum number. As seen in Fig. 2, the bars 21 are of square cross section to permit ready engagement with the V-shaped peripheral notches 22. The square cross section of rods 21 imparts to them highly desirable strength and rigidity and their placement in the discs in the manner specified has the further advantage of forming a cutting or grinding edge which protrudes outwardly from its supports and effectively pulverizes the lumps which are normally present in the fertilizer material. Under some conditions, I may prefer to use bars of other quadralateral shapes such as those diamond or rhomboidal shaped bars as shown in Fig. 4.

In Fig. 3 is shown a modification of the agitator structure which employs a pair of shafts. In this construction, the shaft is divided at its center into two sections 23 and 24. Shaft section 23 is preferably provided with a spindle 25 which is rotatably and slidably fitted into a sleeve 26 formed on shaft section 24 by providing therein a cylindrical bore. Each shaft section carries individually mounted agitator structure of the type otherwise shown and described herein. It is the purpose of this construction to permit a differential action between the two shafts when each wheel of the spreader is fixedly mounted to one of the agitator shafts for the purpose of providing better traction and leverage for rotating the agitator. It will be obvious that when the wheels cause a differential action of the shaft, one section of the agitator may run at a different speed or in reverse direction to the other. However, this will have no effect on the feeding of fertilizer which operates equally well at any reasonable speed or in either direction of rotation of the agitator shaft.

From the above description, it will be seen that I have provided an agitator for fertilizer spreaders which by reason of its design, is of sturdy and simple construction and adapted to perform its function effectively. Variations of structure are possible within the scope of the invention. I do not wish to be limited to the structure shown and described except by the scope of the appended claims.

What I claim is:

1. In a fertilizer spreader, an agitator structure comprising a centrally disposed shaft, spaced agitator bar support elements rigidly mounted on said shaft, said support elements each having spaced generally V-shaped notches in its periphery aligned with corresponding notches in other similar support elements, and agitator bars of quadralateral cross section, two rear surfaces of which are held in said notches to present a tapered cutting edge which protrudes outwardly of said support elements for effectively pulverizing material brought into contact therewith.

2. In a fertilizer spreader having two agitator drive wheels, an agitator structure comprising dual aligned agitators each connected to be driven by only one of said wheels, said agitators each having a central shaft, one of said shafts having a centrally disposed cylindrical bore therein and the other having a cylindrical spindle rotatably fitting into said cylindrical bore.

EDWIN L. MASTERS.

REFERENCES CITED

The following references are of record in the file of this patent:

UNITED STATES PATENTS

| Number | Name | Date |
| --- | --- | --- |
| 69,324 | Davis | Oct. 1, 1867 |
| 140,317 | Sweet | June 24, 1873 |
| 2,180,253 | Moore | Nov. 14, 1939 |